Nov. 10, 1942.   C. J. GROSS   2,301,275
PINKING MACHINE
Filed Nov. 28, 1941   3 Sheets-Sheet 1
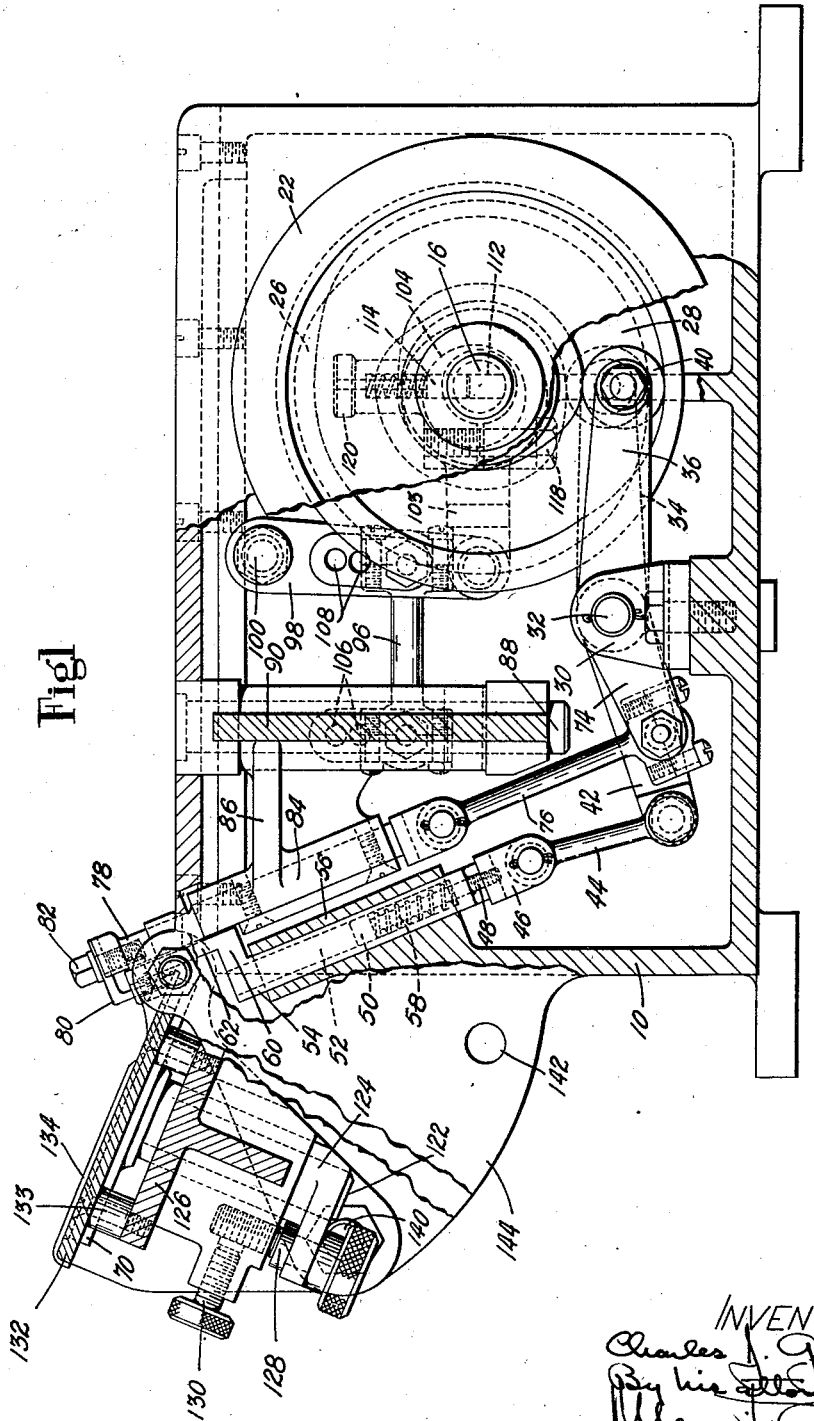

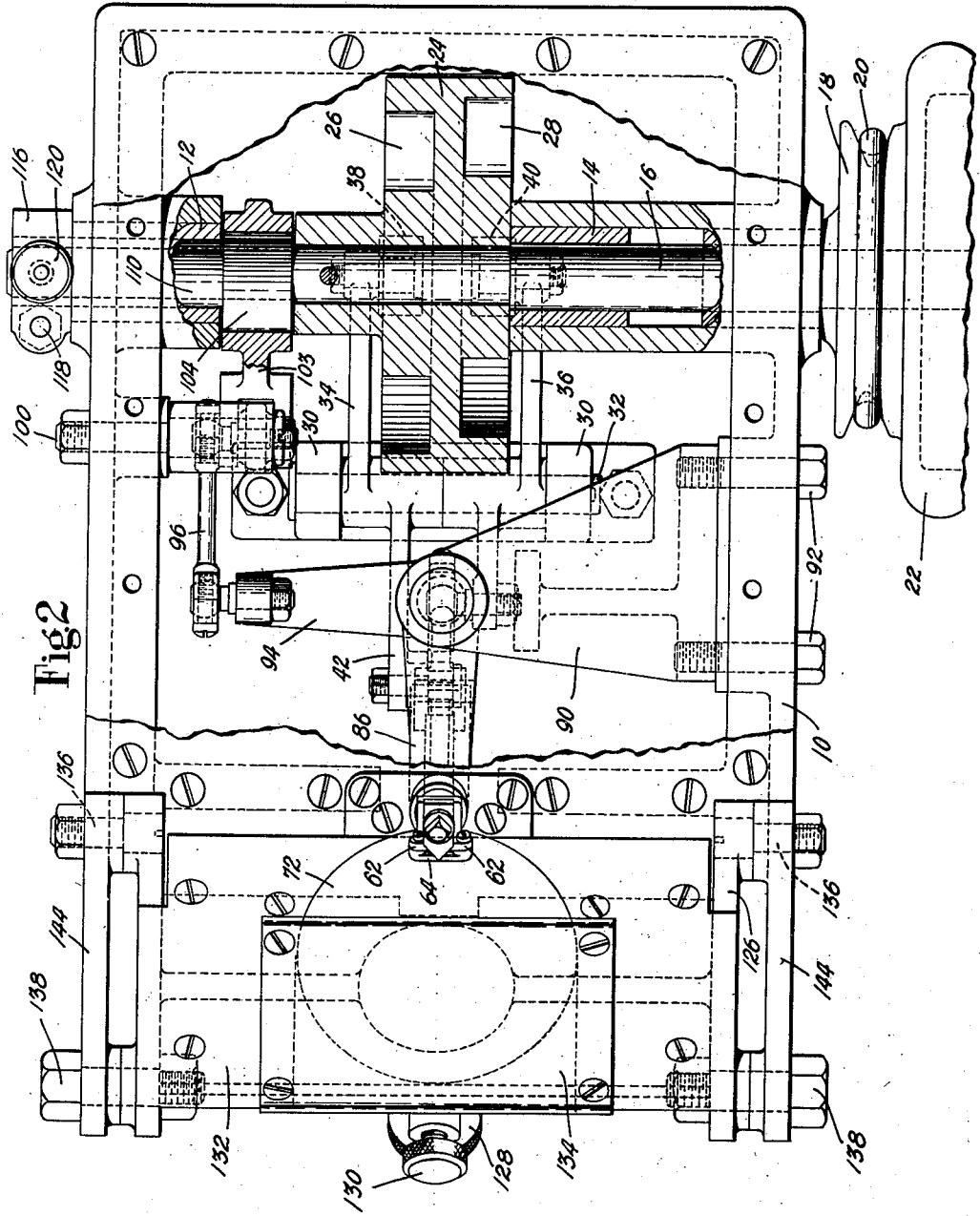

Nov. 10, 1942.        C. J. GROSS          2,301,275
PINKING MACHINE
Filed Nov. 28, 1941          3 Sheets-Sheet 3
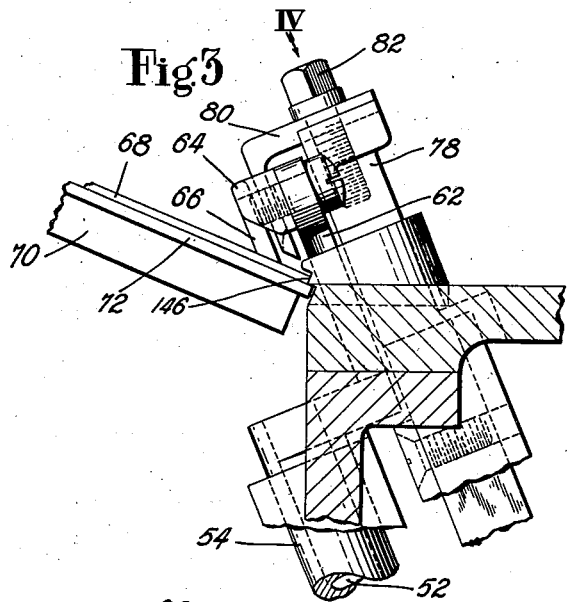
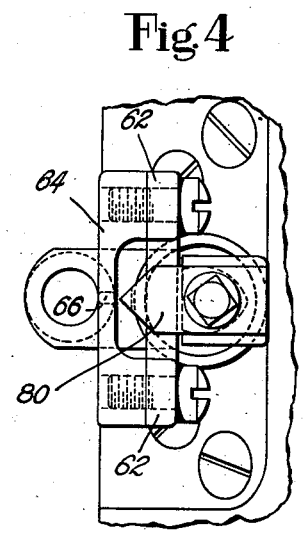
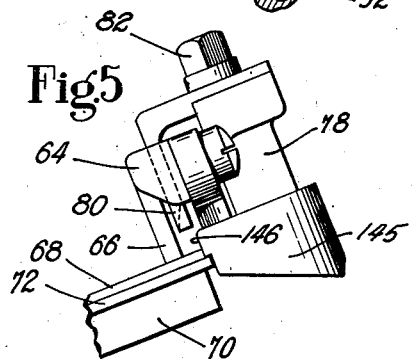
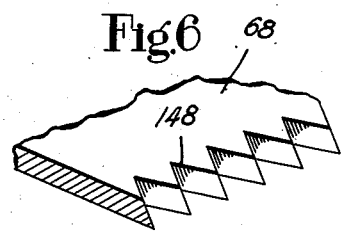
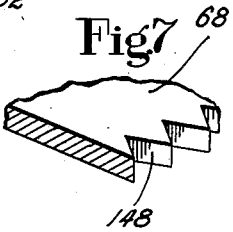
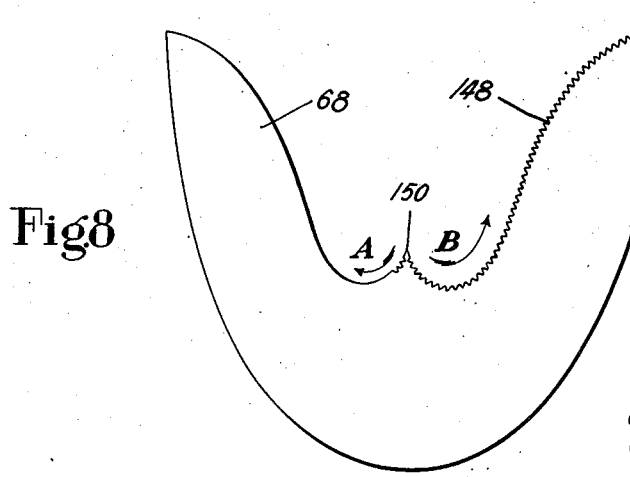

Patented Nov. 10, 1942

2,301,275

UNITED STATES PATENT OFFICE 2,301,275

PINKING MACHINE

Charles J. Gross, Melrose, Mass., assignor to United Shoe Machinery Corporation, Flemington, N. J., a corporation of New Jersey Application November 28, 1941, Serial No. 420,793

8 Claims. (Cl. 164—50)

This invention relates to a machine for forming a serrated edge upon a work piece by cutting therein a continuous series of notches, an operation commercially called pinking.

It is an object of the invention to provide a pinking machine which will operate rapidly, cleanly, and uniformly upon work pieces of all sizes and shapes without the necessity for making any changes or adjustments of dies or cutting tools.

Another object of the invention is to provide an improved pinking machine capable of rapid and accurate operation upon the edges of blanks of peculiar shapes, such, for example, as so-called "wing tips" of shoe uppers, the inner edges of which form two ogee curves meeting in a reentrant point.

A further object of the invention is to provide a pinking machine with which, by a simple change, either beveled pinking or plain, straight pinking, in which the cuts are made perpendicularly through the material, may be done at will.

With these objects in view, I have provided an organized machine in which a V-shaped reciprocating pinking cutter cooperates with a rotary work-supporting table progressively to cut a continuous series of notches in the edge of the work, the work piece being fed intermittently by the cutting tool between successive cuts as the operation proceeds. A holddown, also cooperating with the table, serves to hold the work and preserve its position during the intervals when the cutter is out of engagement with it.

For the purpose of operating upon work pieces such as the wing tips mentioned above, provision is made for easily reversing the direction in which the work is fed through the machine so that the pinking operation may proceed in either direction from a given point on the edge of the work piece. It is easy to start a pinking operation accurately at any desired point but, in the case of a wing tip, when the operation is started at one corner of the blank there is no certainty that the pinking will come precisely right when the center point is reached. I overcome this difficulty by always starting at the center point and operating in both directions therefrom, thus being able to produce a perfect formation at the said center point and, by virtue of the ability of the machine to feed the work in either direction, I am able to secure a satisfactory output of work even upon work pieces of this particularly difficult shape.

In the illustrated machine, the pinking cutter always reciprocates in the same path but the work supporting table is so mounted that it can be readily adjusted to either of two positions in one of which it is at right angles to the path of movement of the cutter, while in the other position it is at an acute angle to said path, so that beveled pinking will be done.

These and other features of the invention and advantages resulting from its use will be better understood and appreciated from reading the following detailed description of one practical embodiment thereof, in connection with the accompanying drawings, in which:

Fig. 1 is a view partly in side elevation and partly in vertical section of the machine;

Fig. 2 is a plan view with some parts shown in horizontal section;

Fig. 3 is a side elevation upon an enlarged scale of the cutter head and a portion of the work-supporting table set for beveled pinking;

Fig. 4 is a plan view looking in the direction of the arrow IV on Fig. 3 with the work table omitted;

Fig. 5 is a view similar to Fig. 3 but showing the work-supporting table set for perpendicular pinking;

Fig. 6 is a perspective view of a portion of a work piece which has been bevel-pinked with the machine arranged as in Fig. 3;

Fig. 7 is a view similar to Fig. 6 but showing the plain pinking produced when the machine is set as in Fig. 5; and, Fig. 8 is a plan view of a wing tip which has been partially operated on by the machine.

Referring now to the drawings, 10 indicates a housing within which most of the mechanism of the machine is contained. Journaled in stationary bearings 12 and 14 is a drive shaft 16 to which is secured a pulley 18 driven by a belt 20 from any suitable or convenient source of power. A hand wheel 22, rigid with the pulley, permits the shaft 16 to the turned by hand when desired.

Also affixed to the shaft 16 is a cam member 24, in the opposite side faces of which are cut cam tracks 26 and 28. The cam 26 operates a holddown which prevents displacement of the work when the cutter is out of engagement therewith and the cam 28 operates the cutter itself, the two cams being relatively so timed that the holddown releases the work piece and permits it to move when the cutter is in the work piece. The mechanism for operating the holddown and the cutter will now be described. Secured to the base of the housing 10 are upright brackets 30 in which is mounted a stationary horizontal pin 32 serving as a pivot for cam levers 34 and 36 at the ends of which are cam rolls 38 and 40, engaging the cam tracks 26 and 28, respectively.

Integral with the cam lever 34 is an arm 42, the outer end of which is connected by a link 44 to a block 46 (Fig. 1). Screwed into the block 46 is a pin 48 having an enlarged head 50 movable longitudinally in a bore 52 formed in a slide 54 which is movable longitudinally in an inclined guide 56 formed in the housing 10. Interposed between the slide 54 and the head 50 of the pin 48 is a compression spring 58 which constitutes a yielding connection between the block 46 and the slide.

The upper portion of the slide is offset at 60 and continues in a forked upward extension, the two arms of which are shown at 62. The upper ends of the arms 62 are connected by a U-shaped member 64 from which a holddown finger 66 depends. The work piece 68 is supported by a table 70 faced with a plate 72 of brass or other soft metal and the relation of the holddown 66 to the work support is such that when the link 44 moves downward, the holddown 66 presses the work piece firmly upon the work support, the spring 58 yielding as may be necessary to accommodate work of different thicknesses.

Rigid with the cam lever 36 is an arm 74 which is connected by a link 76 to the lower end of a knife slide 78. The angularly disposed shank of a V-shaped pinking knife or cutter 80 is clamped to the upper end of the knife slide by a screw 82 and the slide is confined to longitudinal, reciprocatory movement in an inclined guide 84 parallel to the guide 56 in which the holddown slide 54 moves.

The cutter slide guide 84 is sustained by a movable arm 86 mounted to swing horizontally about the vertical axis of a stationary pivot pin 88 which is mounted in an overhanging bracket 90 secured to the inner wall of the housing 10 by bolts 92. Rigid with the arm 86 is a horizontal arm 94 (Fig. 2) extending at right angles thereto and connected by a link 96 to a rocker arm 98 sustained for pivotal movement in a vertical plane about the axis of a fixed stud 100. The lower end of the arm 98 is connected by an eccentric rod 103 to an eccentric 104 which will be described presently.

The outer end of the arm 94 is turned up and the upwardly extending portion is provided with three holes 106 corresponding to three similar holes 108 in the arm 98. The link 96 may be shifted by placing the pivot pins by which its ends are connected to the arms 94 and 98 in different pairs of the holes 106, 108, in order to impart different amounts of swinging movement to the arms 94 and 86, though the throw of the arm 98 from which such movement is derived is constant. The purpose of the aforesaid swinging movement, which is transmitted to the cutter 80, is to cause the cutter to feed the work piece during each cycle of operation through a distance equal to the width of one of the notches cut in the edge of the work piece. Otherwise expressed, the distance through which the cutter is swung when each cut is made will determine the number of pinking cuts per inch along the edge of the work piece and this number may be 6, 9, or 12 per inch, according to which pair of equi-leveled holes 106, 108 is occupied by the pivot pins at the ends of the link 96.

The eccentric 104 is integral with a sleeve 110 which is journaled in the bearing 12. The end portion of the shaft 16 is reduced in diameter to fit closely in the sleeve 110 and has near its end a diametrically disposed hole 112 arranged to receive a spring-pressed pin 114 (Fig. 1) carried by a split collar 116 which is clamped securely upon the outside of the sleeve 110 by a clamp tightening screw 118. The pin 114 has a knob 120 by which the pin may be easily retracted from the hole 112, permitting the sleeve 110 and the eccentric 104 to be rotated 180° around the shaft 16 to a position in which it will be locked securely by the pin 114 entering the other end of the hole 112. The purpose of this shifting of the eccentric 104 through 180° upon the shaft 16 is so to change the timing of the eccentric 104 relative to the cam 28 as to reverse the direction in which the work piece upon the support 70 is fed by the pinking cutter between successive cuts. The reversal occurs because of the reversal of the time relation between the movement of the cutter carrying arm 86, derived from the eccentric 104, and the up and down movement of the cutter slide 78, derived from the cam 28.

The work-supporting table 70 is circular and is affixed to the upper end of a shaft 122 journaled to rotate freely in a bearing 124 carried by a pivotally mounted bracket 126. A screw 128 provides for up or down adjustment of the bearing in the bracket and a locking screw 130 preserves the adjustment. The purpose of this adjustment is to position the cutting plate 72 heightwise so that the cutter 80 will engage it properly to make a clean cut in the work piece. The work-supporting table and cutting plate 70, 72 are surrounded by a normally immovable table 132 supported upon spacers 133 on the bracket 126, and a considerable portion of the rotary plate 72 is covered by a stationary cover plate 134, over which the work is moved to present it to the pinking cutter.

The bracket 126 is pivoted upon the housing 10 at 136 and, with the work supporting table which it carries, is maintained in either of two angular relations to the path of movement of the cutter by bolts 138 which may be inserted through either holes 140 or 142 in stationary wings 144 projecting forward from the housing 10. When the bolts 138 are in the holes 140, the work support will occupy the position illustrated in Fig. 3 and when they are in the holes 142, it will occupy the position shown in Fig. 5. A cutter and a holddown with beveled ends are used when the work support is set for beveled pinking as shown in Fig. 3 and a cutter and a holddown with square ends are used for straight pinking when the work support is set as shown in Fig. 5. The upper end of the cutter slide 78 is surrounded by a block 145 (Fig. 5) having a gage surface 146 formed upon it to guide the edge of the work piece being operated upon.

In Fig. 6 is shown a fragment of the work piece 68 with notches 148 in the edge thereof cut in an inclined direction to produce beveled pinking. This is the result of using the machine when set up as shown in Fig. 3. In Fig. 7 is illustrated a fragment of a work piece in which the notches are formed with the machine set up as shown in Fig. 5, the notches 148 being cut perpendicular to the surface of the work piece to produce straight pinking.

In Fig. 8 the work piece is shown in the form of a wing tip, the inner edge of which has a re-entrant point 150 at its center. With the machine of the present invention, in which the work can be fed in either direction, it is possible to pink the edge of such a blank by operating in both directions from the center point 150 as indicated by the arrows A and B. As hereinbefore stated, the pinking can easily be started accurately from the point 150 and thus the pinked blank will have a perfect point at the center, although this would usually not occur if a progressive pinking operation were performed in the same direction throughout the entire length of the inner edge of the blank, since it cannot be foreseen in what part of a notch the end of the pinked edge will fall, and it frequently occurs that the corner at which the pinking operation ceases has a form like that shown at 152. Heretofore it has been necessary to use expensive dies for pinking such pieces as this, a different die being required for each size or shape.

Having described the invention, what is claimed to be new and desired to be secured by Letters Patent of the United States is:

1. In a machine for pinking the edge of a work piece, the combination of a reciprocable pinking cutter, a work supporting table which is freely movable in a fixed plane, means for reciprocating the cutter toward and from the plane of the table, and means for moving the cutter in a direction transverse to its path of reciprocation while it is in engagement with a work piece upon the table.

2. In a machine for pinking the edge of a work piece, the combination of a reciprocable pinking cutter, a work supporting table which is freely movable in a fixed plane, means for reciprocating the cutter toward and from the plane of the table, and means for moving the cutter in either direction, as determined by the operator, transverse to its path of reciprocation while it is in engagement with a work piece upon the table.

3. In a pinking machine, the combination of a work support, a reciprocable pinking cutter movable toward said work support to cut a work piece thereon and movable in a direction transverse to its path of reciprocation to feed the work piece, means for reciprocating the cutter and moving it transversely, and means for changing the relative timing of the reciprocating and transverse movements to reverse the direction of feed.

4. In a pinking machine, the combination of a work support, a reciprocable pinking cutter movable toward said work support to cut a work piece thereon and movable in a direction transverse to its path of reciprocation to feed the work piece, means for reciprocating the cutter, separate means for moving the cutter transversely, and means for changing the timing of said separate means, relative to that of the cutter reciprocating means, to reverse the direction of feed.

5. In a pinking machine, the combination of a work support, a reciprocable pinking cutter movable toward said work support to cut a work piece thereon and movable in a direction transverse to its path of reciprocation to feed the work piece, a drive shaft, a cam and an eccentric, one of which is affixed to the drive shaft and the other of which can be rotated upon said shaft, manually operable means by which the rotatable element can readily be locked to the shaft in either of two positions diametrically opposite to each other, operating connections between the cam and the cutter whereby to reciprocate the cutter, and operating connections between the eccentric and the cutter whereby to move the cutter transversely.

6. In a pinking machine, the combination of a work support, a pinking cutter cooperating with the work to cut a work piece thereon, a driven eccentric having a constant throw and operating connections between the eccentric and the cutter whereby to move the cutter to feed the work piece on the work support, said connections including a shiftable element by changing the position of which different amounts of feed movement may be imparted to the cutter.

7. In a pinking machine, the combination of a pinking cutter which is reciprocable in a fixed path, a freely rotatable work supporting table positioned in the path of the cutter, a pivotally mounted bracket carrying said table, and means for securing the bracket in any one of a plurality of different angular relations to the path of movement of the cutter.

8. In a pinking machine, the combination of a movable work support, a reciprocable pinking cutter movable toward and from the work support to cut a work piece thereon and transversely to feed the work and a holddown cooperating intermittently with the work support to hold the work and preserve its position during intervals when the cutter is out of engagement therewith.

CHARLES J. GROSS.